United States Patent [19]

Franchin

[11] 4,053,073

[45] Oct. 11, 1977

[54] LEVEL LIFTING SYSTEM FOR TRUCK BODIES OR CONTAINERS

[75] Inventor: Franco Franchin, Treviso, Italy

[73] Assignee: Officine Franchin di Giuliano Franchin & C. S.a.s., Italy

[21] Appl. No.: 640,977

[22] Filed: Dec. 15, 1975

[51] Int. Cl.² .................................. B60P 1/54
[52] U.S. Cl. ......................... 214/515; 91/411 R; 60/484; 254/45; 254/89 H
[58] Field of Search ............ 254/45, 86 H, 93 R, 254/89 H; 214/515; 91/170, 411 R; 60/484; 288/763; 212/145; 100/269, 40

[56] References Cited

U.S. PATENT DOCUMENTS

| 2,462,580 | 2/1949 | Watson | 91/387 X |
| 3,002,760 | 10/1961 | Lee | 214/515 X |
| 3,106,064 | 10/1963 | McLeod | 60/484 |
| 3,119,503 | 1/1964 | Herpich et al. | 214/515 X |
| 3,830,466 | 8/1974 | Rasmussen et al. | 254/47 |

Primary Examiner—Albert J. Makay
Attorney, Agent, or Firm—D. Paul Weaver

[57] ABSTRACT

To avoid instability, tilting or overturning of containerized freight or truck bodies during raising and lowering thereof, four double-acting lift cylinders are disposed at the four corners of a rectangular array, the cylinders comprising two pairs of cylinders, each pair of which comprises one cylinder which is connected in series to the respective cylinder at the diagonally opposite corner of the rectangular array of cylinders.

4 Claims, 5 Drawing Figures

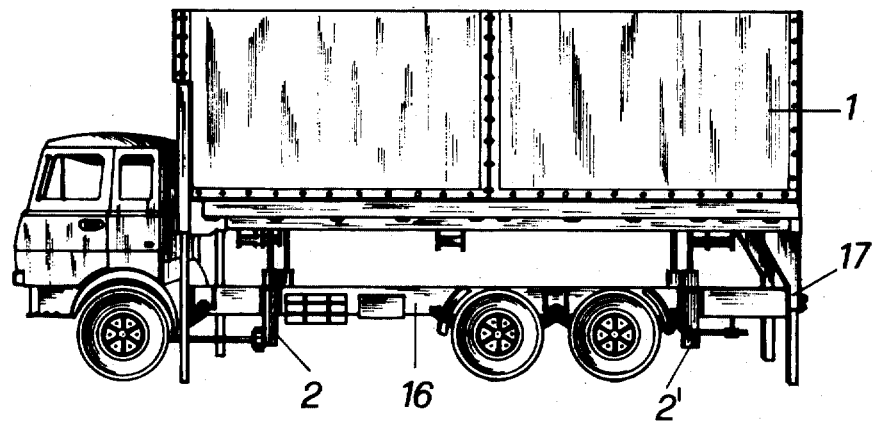
FIG. 4
FIG. 5
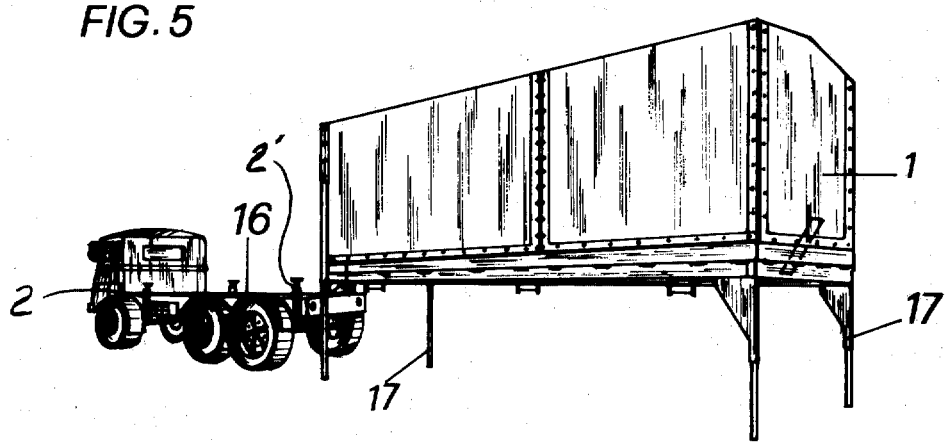

LEVEL LIFTING SYSTEM FOR TRUCK BODIES OR CONTAINERS

BACKGROUND OF THE INVENTION

The present invention relates to a lifting system for lifting interchangeable truck bodies or freight containers adapted to be hauled by automotive trucks.

Such truck bodies or containers are known which are provided at their four corners with hydraulic cylinders having vertical axes. These cylinders serve to make the body or container interchangeable, permitting its removal from a hauling vehicle during loading and unloading operations, and its subsequent mounting on the same or on another vehicle for transport purposes. Furthermore, during the loading and unloading operations, these cylinders enable the height of the bottom of the body or container to be continuously varied, thereby facilitating the operations.

Known lifting devices have a shortcoming concerned with the synchronization of the lift cylinders, that is to say, the operation of the four cylinders at the same moment, even with a load badly centered in the body or freight container. If in fact the four cylinders are operated by a single pump and if a badly centered load is placed in the body, it may happen that the pump fluid will pass more easily into the less loaded cylinders, thereby unequalizing the system and possibly overturning the body or container.

In order to overcome this fault, it has been proposed in the art to feed the four cylinders by means of flow dividers, which are able to supply the same amounts of fluid to the four cylinders independently of the inlet pressures of the latter.

Nevertheless, this solution has various shortcomings. Firstly, the same extension of the four cylinders insures that the body or container will rest on the ground only if the latter is entirely flat. Secondly, the limited precision of the flow dividers, due to the length of the cylinders, may give rise to an unacceptable difference in the extension of the cylinder, since the points of support on the ground may not be coplanar. Finally, the hydraulic circuit is fairly complex, delicate, and expensive.

Therefore, according to the present invention, the shortcomings of the known prior art are completely corrected by a novel fluid circuit arrangement in which the four lift cylinders are incorporated. In a preferred embodiment of the invention, the truck body or container lifting system comprises four doubleacting cylinders which are respectively disposed at the four corners of a rectangular array, the cylinders comprising two pairs of cylinders, each pair of which includes one cylinder which is connected in series to the cylinder at the diagonally opposite corner of the rectangular array.

Each cylinder of the system is preferably vertically disposed and contains a piston which divides the cylinder into an upper and a lower chamber, each pair of cylinders comprising a cylinder whose lower chamber is connected to the upper chamber of the other cylinder of the pair. Preferably, the effective cross sectional areas of the interconnected upper and lower chambers are equal to each other.

Means may be provided for insuring that the fluid pressures prevailing in the two said pairs are substantially equal. Thus, the means may comprise maximum pressure relief valves which are connected between an inlet and an outlet of one of the two cylinders of each pair.

Preferably, the upper chamber of one cylinder of each said pair is connected to a common first pipe for the supply of pressure fluid thereto, the lower chamber of one cylinder of each pair being connected to a common second pipe for the supply of pressure fluid thereto.

The upper ends of the cylinders may engage a common load.

Other features and advantages of the invention will become apparent during the course of the following description.

BRIEF DESCRIPTION OF DRAWINGS

FIG. 4 is a further side elevation of the invention as in FIG. 3 and depicting operation of the lifting system to effect removal of the body or container from the vehicle.

FIG. 5 is a perspective view of the invention as in FIGS. 3 and 4 following the lifting and removal procedures.

DETAILED DESCRIPTION

Figure 1:
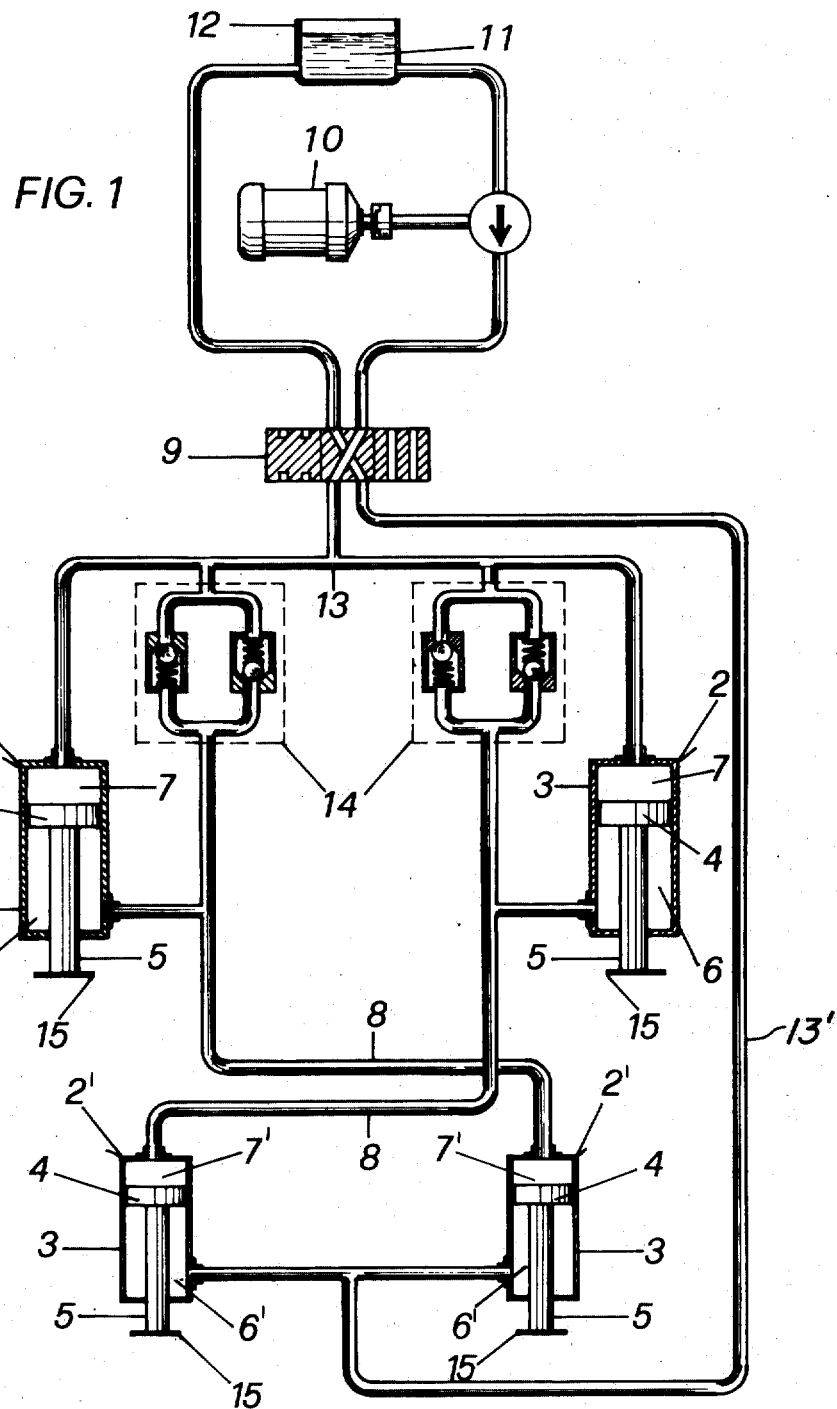
FIG. 1 is a diagrammatic view of a hydraulic circuit embodying the lifting system according to one preferred embodiment of the invention.
Figure 2:
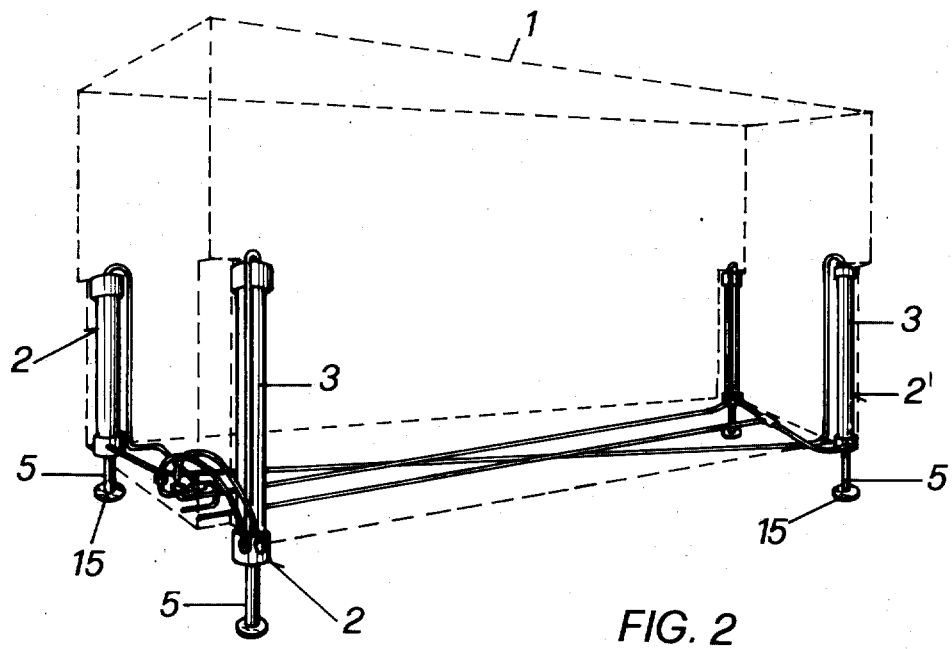
FIG. 2 is a perspective view, partly in broken lines, showing the invention according to the hydraulic circuit of FIG. 1.

Referring to the drawings in detail wherein like numerals designate like parts, and referring first to FIG. 1, four double-acting hydraulic cylinders 2 and 2' are respectively located at the four corners of a rectangular array, the said cylinders comprising front cylinders 2 and rear cylinders 2'. The cylinders 2 and 2' have parallel vertical axes and are applied to the four corners of a container or conventional truck body 1, as indicated in FIG. 2. Each cylinder has a body 3 which is suitably fixed to the container or body 1. Each cylinder additionally has a piston 4 which is slidable in the cylinder body 3 and which carries a rod 5, to the end of which is attached a ground support shoe 15. The front cylinders 2 are provided with lower and upper chambers 6 and 7 below and above the pistons 4, while the rear cylinders 2' are provided with lower and upper chambers 6' and 7' below and above the pistons 4.

The two cylinders 2 and 2', at the opposite ends of each diagonal of the rectangular array, are connected in series. Thus, the lower chamber 6 of each front cylinder 2 is connected with the upper chamber 7' of the rear cylinder 2' diagonally opposite by means of a pipe 8. In addition, the inside diameters of the front cylinders 2 and rear cylinders 2' and the diameter of the rods 5 have values such that the effective cross-sectional annular area of the lower chamber 6 of each front cylinder 2 and the effective cross-sectional area of the upper chamber 7' of each rear cylinder 2' are equivalent. That is to say they satisfy the relationship $D^2 - d^2 = D'^2$, in which D is the inside diameter of each front cylinder 2, d is the diameter of the rod 5 of the corresponding piston 4, and D' is the inside diameter of each rear cylinder 2'. In this way, equivalent movement of the pistons of the two cylinders of the same pair is insured.

The two pairs of cylinders, connected in this manner, are fed in parallel, with the aid of a distributor 9, by a pump 10, which takes oil 11 from a tank or reservoir 12, oil being supplied from the distributor 9 to the upper chambers 7 of the front cylinders 2 by a common inlet pipe 13.

Between the common inlet pipe 13 and each pipe 8 there is interposed a maximum pressure valve 14 whose function, as will be better understood hereinbelow, is to rebalance the two pairs of cylinders in the event of variations of volume of the liquid contained in each closed circuit comprising the lower chamber 6 of a front cylinder 2, a pipe 8 and the upper chamber 7' of the diagonally opposite rear cylinder 2'.

The lower chambers 6' of rear cylinders 2' are connected by a common pipe 18' to the distributor 9.

The arrangement functions in the following manner. When the operator wishes to unload the goods contained in the container 1 mounted on the chassis of a truck, not shown, he first operates the distributor 9 so that with the aid of the latter the pump 10 delivers oil to the upper chambers 7 of the front cylinders 2. As the two front pistons 4 descend, they effect discharge of the oil contained in the lower chambers 6 of the front cylinders 2 and, by means of the pipes 8, deliver this oil to the upper chambers 7' of the two diagonally opposite rear cylinders 2'. Consequently, the pistons 4 of the front and rear cylinders are moved to the same extent, while the oil contained in the lower chambers 6' of the rear cylinders 2' passes to the distributor 9 and then to the tank 12.

In this manner, the body or container 1 which had previously been unlocked from a vehicle chassis, is raised in a level manner and can be removed from the chassis without fear of tilting or overturning.

The operator then operates the conventional distributor 9 in the opposite direction, so that by permitting the circulation of the oil in the opposite direction in the four cylinders, the distributor 9 effects the lowering of the container 1 to the desired elevation while level for greater convenience in the operations of loading and unloading.

The container 1 is placed in position on the truck chassis by appropriate action of the distributor 9.

Any leaks in the seals of cylinders 2 and 2' may give rise to a variation in the amounts of oil in the two closed circuits, with misadjustment of the positions of the pistons of one pair in relation to those of the other pair. The two maximum pressure valves 14, which act during extension of the rods 5 at the end of the stroke, eliminate this disadvantage by opening a junction between the common inlet pipe 13 and the corresponding pipe 8, enabling liquid to pass out of or enter the last-mentioned pipe depending upon requirements, and consequently permitting the resynchronization or rebalancing of the cylinders. Thus, the pressures prevailing in each of the closed circuits are substantially equal.

Another advantage offered by the lifting device is that stable support of the container or body 1 is possible on the four points, whatever the condition of loading and the configuration of the ground. With regard to the load, in fact, even if it is badly centered, the crossed junction of the two pairs of cylinders enables a constant extension of the four rods to be achieved, in view of the fact that the oil, which tends to enter more readily the pair of cylinders which may be less loaded, effects a balanced distribution of forces and consequently holds the container always perfectly parallel to the ground.

With regard to the configuration of the ground, even if this is irregular, stable support of the container 1 is nevertheless obtained on the four shoes 15, even if it is inclined. If the ground is irregular in contour, the cylinders of one diagonal will in fact bear safely on the ground; furthermore, the rods of the cylinders of the other diagonal will have the same extension even if this is different from the extension of the first-mentioned diagonal.

Another advantage offered by the invention is the automatic resynchronization of the cylinders with the aid of the two maximum pressure valves 14.

A still further advantage offered by the invention is great simplicity of installation and consequently operational reliability and low cost.

Figure 3:
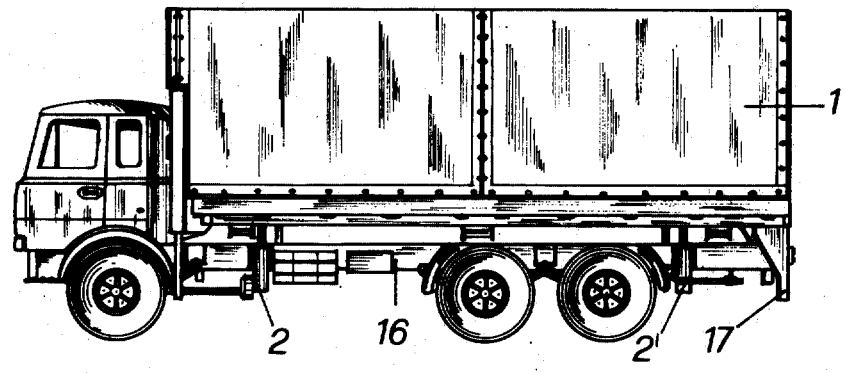
FIG. 3 is a side elevational view of a transport truck and container body having a lifting means according to a modification of the invention.

In another embodiment of the invention, shown in FIGS. 3, 4 and 5, the device is mounted on the chassis 16 of the vehicle instead of being mounted on the body 1. The body 1 is provided with stiff legs 17 telescopically extensible in a known manner, FIG. 3. In this case, even if the principle of the invention is substantially unchanged, the removal of the body 1 from the chassis 16 is effected in the following manner. First the operator, acting as previously described, causes the raising of the body 1 from the chassis 16, then he extends the four legs 17 as far as they reach the ground, FIG. 4, and afterwards, by acting so that oil 11 circulates in the opposite direction in the four cylinders 2 and 2', the operator again effects the lowering of the body 1 as far as necessary to cause the four legs 17 to engage the ground. Following this, the vehicle chassis 16 can move away from under the body or container. The mounting of the body 1 on the chassis 16 is effected with the reverse operative sequence.

From the above, it is clear that the second embodiment of the invention is only utilized during the loading and unloading of goods when the body 1 can be maintained at a higher elevation than the normal elevation of the chassis 16.

Additional advantages obtained by the invention include greater simplicity of construction of the body or container 1; the possibility of using cylinders 2 and 2' of lesser length; and the possibility of using the same lifting means for several bodies or containers.

I claim:

1. A lifting system for truck bodies and the like comprising four double-acting cylinder-piston units arranged in a rectangular array, each cylinder-piston unit in said array having an upper and a lower chamber on opposite sides of the piston of such unit, conduit means serially connecting the lower chambers of one pair of units in the array with the upper chambers of the pair of units which are diagonally opposite in said array, conduit means connected with the upper chambers of said one pair of units and feeding pressurized fluid to said upper chambers in parallel, return conduit means connected with the lower chambers of the second-named pair of units in said rectangular array and returning fluid from said lower chambers in parallel to a source of fluid, a fluid pumping means connected with said source of fluid, and a fluid distributor connected with the pumping means and with the second-named and return conduit means, said double-acting cylinder-piston units having extensible and retractable members which are ground-engageable, and said cylinder-piston units being adapted for attachment to a container body.

2. A lifting system for truck bodies and the like as defined in claim 1, and means for equalizing fluid pressures in the lower chambers of said one pair of units relative to the fluid pressures in the upper chambers of said diagonally opposite units, and said conduit means connected with said upper chambers of said one pair of units comprising a single conduit common to said upper chambers and communicating directly therewith, said return conduit means also comprising a single conduit common to said lower chambers and communicating directly therewith.

3. A lifting system for truck bodies and the like as defined in claim 1, and a pair of maximum pressure relief valves connected with the second-named conduit means in parallel and connected with the lower chambers of said one pair of units and also connected with the upper chambers of the pair of units which are diagonally opposite said relief valves in said array.

4. A lifting system for truck bodies and the like as defined in claim 1, and said four cylinder-piston units mounted on a truck chassis and connected with a truck body resting on the chassis and operable to raise and lower the body relative to the chassis.

* * * * *